(12) United States Patent
Chen et al.

(10) Patent No.: US 11,785,389 B2
(45) Date of Patent: *Oct. 10, 2023

(54) DYNAMIC ADJUSTMENT OF EARBUD PERFORMANCE CHARACTERISTICS

(71) Applicant: Logitech Europe S.A., Lausanne (CH)

(72) Inventors: John Chen, San Ramon, CA (US); Ganesh Kandiga, Chennai (IN); Karthikayan Vellaikkannu, Chennai (IN); Hari Chakravarthula, San Jose, CA (US)

(73) Assignee: Logitech Europe S.A., Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/743,179

(22) Filed: May 12, 2022

(65) Prior Publication Data

US 2022/0329945 A1    Oct. 13, 2022

Related U.S. Application Data

(63) Continuation of application No. 17/009,552, filed on Sep. 1, 2020, now Pat. No. 11,363,383.

(51) Int. Cl.
| | |
|---|---|
| *H04R 5/04* | (2006.01) |
| *H04R 5/033* | (2006.01) |
| *H04R 3/04* | (2006.01) |
| *H04R 3/00* | (2006.01) |
| *G06F 3/16* | (2006.01) |
| *G06F 3/01* | (2006.01) |

(Continued)

(52) U.S. Cl.
CPC .............. *H04R 5/04* (2013.01); *G06F 3/011* (2013.01); *G06F 3/017* (2013.01); *G06F 3/16* (2013.01); *H04R 3/005* (2013.01); *H04R 3/04* (2013.01); *H04R 5/033* (2013.01); *H04W 4/029* (2018.02); *H04W 88/08* (2013.01); *H04R 1/1016* (2013.01); *H04R 2420/07* (2013.01)

(58) Field of Classification Search
None
See application file for complete search history.

(56) References Cited

U.S. PATENT DOCUMENTS

| | | | |
|---|---|---|---|
| 9,438,985 B2 * | 9/2016 | Dusan | H04R 1/1083 |
| 9,980,075 B1 * | 5/2018 | Benattar | H04S 7/303 |

(Continued)

*Primary Examiner* — Paul W Huber
(74) *Attorney, Agent, or Firm* — KILPATRICK TOWNSEND & STOCKTON LLP

(57) ABSTRACT

In some embodiments, a system comprises a host computing device and an audio device including at least one speaker and a plurality of microphones, the audio device being wirelessly and communicatively coupled to the host computing device. The host computing device can include one or more processors and one or more machine-readable, non-transitory storage mediums that include instructions configured to cause the one or more processors of the host computing device to perform operations including: receiving user environment data by one or more sensors of the host computing device; determining a characterization profile of a surrounding environment of the user based on the user environment data; and sending the characterization profile to the audio device, the characterization profile configured to cause the audio device to adapt an audio cardioid pattern of the plurality of microphones on the audio device based on the characterization profile.

16 Claims, 8 Drawing Sheets

(51) Int. Cl.
*H04W 4/029* (2018.01)
*H04W 88/08* (2009.01)
*H04R 1/10* (2006.01)

(56) References Cited

U.S. PATENT DOCUMENTS

| | | | |
|---|---|---|---|
| 10,887,685 B1* | 1/2021 | Harmke | H04R 1/04 |
| 2012/0020485 A1* | 1/2012 | Visser | H04R 5/033 |
| | | | 381/57 |
| 2014/0270200 A1* | 9/2014 | Usher | G10L 25/78 |
| | | | 381/74 |
| 2018/0061409 A1* | 3/2018 | Valentine | G10L 15/20 |
| 2020/0128322 A1* | 4/2020 | Sabin | G06F 3/012 |
| 2020/0265860 A1* | 8/2020 | Mouncer | H04R 5/04 |
| 2020/0389740 A1* | 12/2020 | Sabin | H04R 25/507 |
| 2021/0125609 A1* | 4/2021 | Dusan | G10L 25/21 |

* cited by examiner

DYNAMIC ADJUSTMENT OF EARBUD PERFORMANCE CHARACTERISTICS

CROSS REFERENCE PARAGRAPH FOR PRIORITY

This application is continuation of U.S. Non-Provisional application Ser. No. 17/009,552, filed on Sep. 1, 2020, and titled "DYNAMIC ADJUSTMENT OF AUDIO DEVICE PERFORMANCE CHARACTERISTICS," which is hereby incorporated by reference in its entirety for all purposes.

BACKGROUND

Headphones typically include a pair of small loudspeaker drivers worn on or around the head and over a user's ears. They include electroacoustic transducers (e.g., speakers) configured to convert an electrical signal to a corresponding sound (e.g., music, voice, sound, etc.). Earbuds have similar features including a speaker and typically plug into a user's ear canal. Headphones and earbuds can be referred to generally as "audio devices." Audio devices can be driven by a number of different sources, including mobile computing devices such as smart phones, media player devices, etc., which can referred to more generally as "host computing devices."

Early versions of audio devices were typically hardwired to their corresponding host computing devices. Wireless audio devices brought many new advantages including greater range, no cumbersome wires to untangle, and convenience. However, wireless audio devices often suffer from limited processing bandwidth and battery life. As mobile technologies have continued to mature, wireless audio devices have become increasingly popular and are often used during recreation and in office and social environments. However, users can sometimes operate audio devices at a high enough volume that can obscure or "drown out" ambient sounds including alerts, dangers, or other nearby occurrences that may be important for the user to be aware of. Improvements in audio device technology are need to better keep a user engaged with their surrounding environment.

BRIEF SUMMARY

In some embodiments, a system comprises a host computing device and an audio device worn on a user's head, the audio device including at least one speaker configured to project audio into the user's ear and a plurality of microphones, the audio device being wirelessly and communicatively coupled to the host computing device, wherein the host computing device includes one or more processors and one or more machine-readable, non-transitory storage mediums that include instructions configured to cause the one or more processors of the host computing device to perform operations including: receiving user environment data by one or more sensors of the host computing device; determining a characterization profile of a surrounding environment of the user based on the user environment data; and sending the characterization profile to the audio device, the characterization profile configured to cause the audio device to adapt an audio cardioid pattern of the plurality of microphones on the audio device based on the characterization profile.

The host computing device can include at least one microphone, wherein the user environment data is detected by the at least one microphone, and wherein the user environment data includes audio data corresponding to the surrounding environment of the user. In some cases, the host computing device can include a global positioning system (GPS), where the user environment data includes GPS data corresponding to a location of the user; an inertial measurement unit (IMU), where the user environment data includes acceleration data corresponding to a motion of the user or orientation data corresponding to an orientation of the user; and a communication module configured to connect to an internet access point, where the user environment data includes internet access point data. In some aspects, the audio cardioid pattern includes at least one of a forward facing cardioid pattern, a rear facing cardioid pattern, and an omnidirectional cardioid pattern. The host computing device can be one of a smart phone, smart watch, head-mounted device, smart glasses, or a mobile computing device. The audio device can be one of a wireless audio headset or a set of wireless audio earbuds. In certain embodiments, the characterization profile can include data corresponding to human speech directed to the user, and where adapting the audio cardioid pattern of the plurality of microphones on the audio device based on the characterization profile includes dynamically selecting the audio cardioid pattern having a best fidelity or amplitude of the human speech directed to the user. In some cases, adapting the audio cardioid pattern of the plurality of microphones on the audio device based on the characterization profile further includes adjusting equalization parameters or audio level balancing to improve a fidelity or amplitude of the human speech directed to the user.

In certain embodiments, an audio device comprises one or more processors; a speaker controlled by the one or more processors, the audio device being configured to be worn by a user such that the speaker projects audio into the user's ear; a plurality of microphones controlled by the one or more processors; and a communication module configured to wirelessly and communicatively couple the audio device to a remote host computing device. In some cases, the one or more processors can be configured to receive a characterization profile corresponding to a surrounding environment of the user from the host computing device via the communication module, the characterization profile based on user environment data collected by the host computing device, and adapt an audio cardioid pattern of the plurality of microphones based on the characterization profile.

In some implementations, the characterization profile can be further based on user environment data including GPS data corresponding to a location of the user, acceleration data corresponding to a motion of the user or orientation data corresponding to an orientation of the user, or internet access point data. The audio cardioid pattern can include at least one of a forward facing cardioid pattern, a rear facing cardioid pattern, and an omnidirectional cardioid pattern. In some aspects, the audio device includes at least one of a wireless audio headset or a set of wireless audio earbuds. In some aspects, the characterization profile includes data corresponding to human speech directed to the user, and wherein adapting the audio cardioid pattern of the plurality of microphones on the audio device based on the characterization profile includes dynamically selecting the audio cardioid pattern having a best fidelity or amplitude of the human speech directed to the user. In some cases, adapting the audio cardioid pattern of the plurality of microphones on the audio device based on the characterization profile further includes adjusting equalization parameters or audio level balancing to improve a fidelity or amplitude of the human speech directed to the user.

In further embodiments, a method for operating an audio device can comprise: receiving, by one or more processors on the audio device, a characterization profile corresponding to a surrounding environment of a user from a host computing device wirelessly and communicatively coupled to the audio device, where the characterization profile is based on user environment data collected by the host computing device, and wherein the audio device is configured to be worn by a user such that a speaker of the audio device projects audio into the user's ear; determining, by the one or more processors, an audio cardioid pattern to be applied to a plurality of microphones on the audio device based on the characterization profile; and adapting the plurality of microphones to detect audio according to the determined audio cardioid pattern, wherein the audio device is one of a wireless audio headset or a set of wireless audio earbuds. In some aspects, the user environment data includes at least one of: GPS data corresponding to a location of the user; acceleration data corresponding to a motion of the user; orientation data corresponding to an orientation of the user; or internet access point data. The audio cardioid pattern may include at least one of a forward facing cardioid pattern, a rear facing cardioid pattern, and an omnidirectional cardioid pattern. In some aspects, the user environment data includes data corresponding to human speech directed to the user, and wherein adapting the audio cardioid pattern of the plurality of microphones on the audio device includes dynamically selecting the audio cardioid pattern having a best fidelity or amplitude of the human speech directed to the user. In some cases, adapting the audio cardioid pattern of the plurality of microphones on the audio device based on the characterization profile further includes adjusting equalization parameters or audio level balancing to improve a fidelity or amplitude of the human speech directed to the user.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which.

Throughout the drawings, it should be noted that like reference numbers are typically used to depict the same or similar elements, features, and structures.

DETAILED DESCRIPTION

Figure 1A:
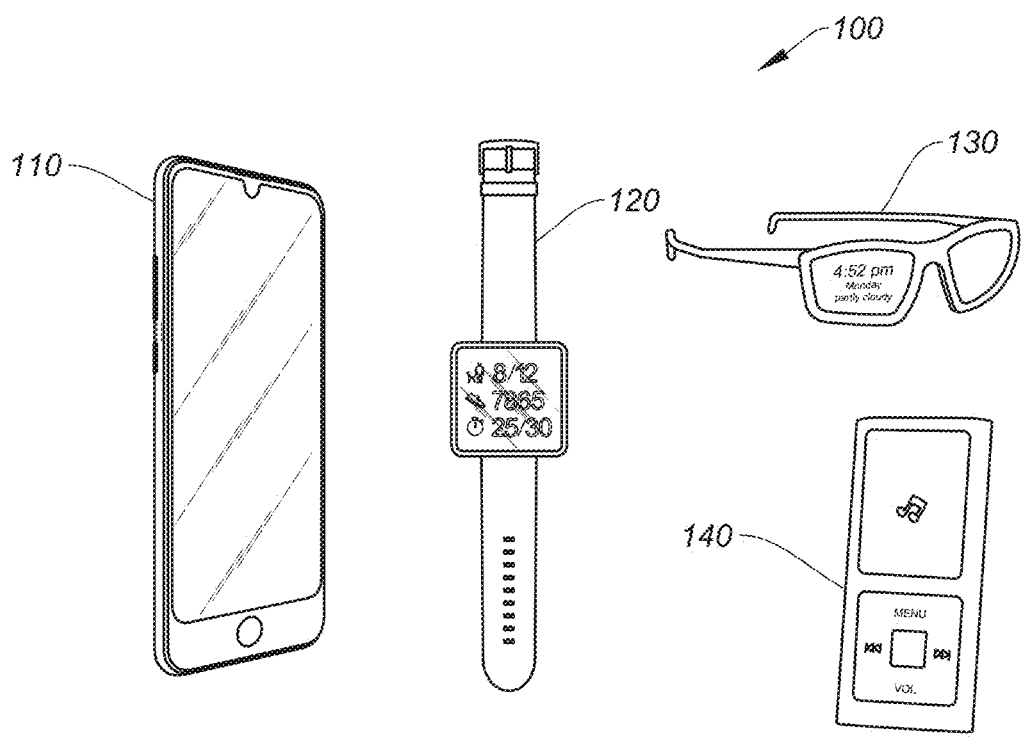
FIG. 1A shows various examples of host computing devices, according to certain embodiments.

Aspects of the present disclosure relate generally to audio, and more particularly to the dynamic adjustment performance characteristics on an audio device, according to certain embodiments.

In the following description, various examples of the dynamic adjustment of audio device performance characteristics are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high level summary is intended to provide a basic understanding of some of the novel innovations depicted in the figures and presented in the corresponding descriptions provided below. Many of the embodiments relate to novel audio devices that can be configured to dynamically adjust certain performance characteristics in response to a user's environment. Headphones, earbuds, or other device with an electroacoustic transducer ("speaker") configured to project audio into a user's ear can be referred to generally as "audio devices" throughout this disclosure. Audio devices can be driven by a number of different suitable sources (e.g., typically mobile devices) including smart phones, media players, smart wearables (e.g., smart watch, smart glasses, etc.) or other type of mobile computing device, and may be referred to generally as "host computing devices" or "host devices" throughout this disclosure.

In certain embodiments, audio devices may include one or more microphones disposed thereon to perform additional functionality. For instance, in addition to directing audio (e.g., music, voice, audio for a video program, etc.) to the user's ear via one or more speakers, the one or more microphones can be used to detect ambient audio sources around the user, such as crowd noise, traffic, speech, external music, white noise, etc. The detected noise can be used, for instance, to provide noise cancellation by inverting the audio from the ambient audio sources and directing it into the user's ear via the speakers (e.g., after amplitude balancing, equalizing (EQ), etc.), as would be appreciated by one of ordinary skill in the art with the benefit of this disclosure.

In some exemplary embodiments, the detected audio from one or more ambient and external audio sources can be intelligently passed through to the user based on user preference using a novel system and method that dynamically adapts a microphone cardioid pattern (e.g., a direction that the microphone is primarily directed to using audio beamforming) for a plurality of microphones on the audio device to preferentially detect audio in particular directions and pass that audio on (e.g., amplify and mix) to the user via the one or more speakers. For instance, if a biker is riding along the side of the road and listening to an audiobook via an audio device, but wants to be able to hear when a car is approaching from the rear, a cardioid pattern for the plurality of microphones can be changed to be directed to the rear of the user. This will effectively pick up road noise and sounds coming from behind the user more readily than sounds coming from in front of or to the sides of the user. In another example, if a user is listening to music on an audio device and a friend sitting in front of her begins to speak, then aspects of the invention can modify a cardioid pattern for the plurality of microphones to preferentially detect sounds directed in front of the user (e.g., where her friend is sitting) so that the user can enjoy her music, but not miss anything her friend might say. Scenarios like these are presented and described below with respect to FIGS. 4A-6B.

Figure 4A:
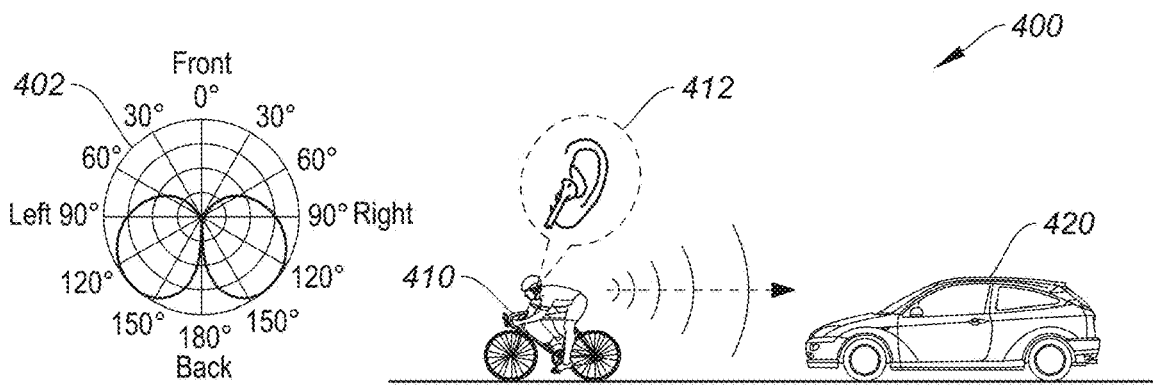
FIG. 4A shows a biker with an audio device configured with a rear facing cardioid pattern, according to certain embodiments.
Figure 4B:
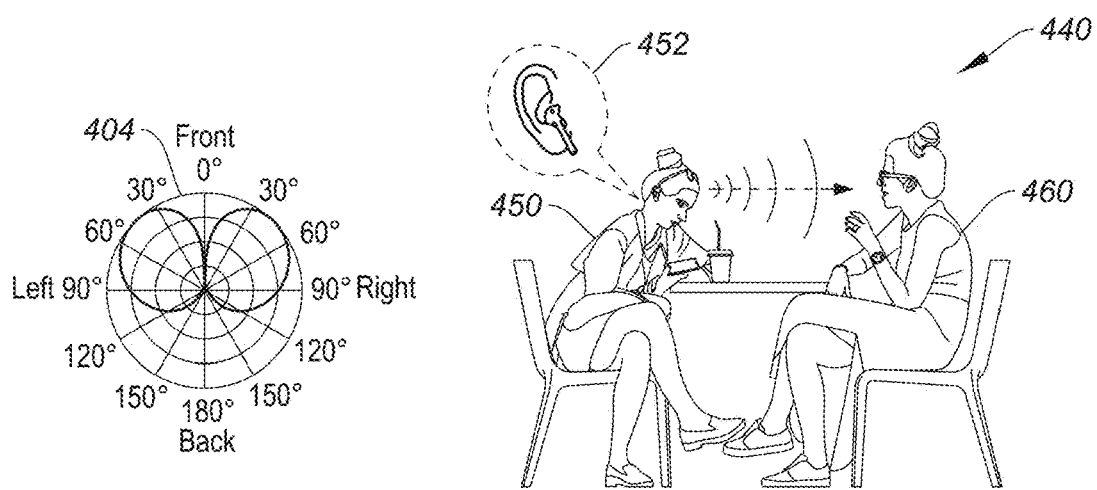
FIG. 4B shows a customer with an audio device configured with a front facing cardioid pattern, according to certain embodiments.

The automatic configuring of the cardioid patterns are made possible due, at least in part, on sensory capabilities of the host computing device. In addition to sending audio to the audio device, the host computing device may use one or more sensors to gather user environment data around the user. For instance, ambient audio can be detected with one or more microphones on the host computing, a location of the user can be detected via a global positioning system (GPS), a movement of a user can be detected via an inertial measurement unit (e.g., based on the user's motion, the host computing device may detect that they are sitting, walking, biking, running, etc.), a location of a user can be detected based on a detected Wi-Fi access point (e.g., based on a name of the access point, e.g., "Roman's Café," the host computing device can determine that the user is sitting in a coffee shop in a social setting), or other suitable detection methodology. The host computing device can determine a characterization profile of a surrounding environment of the user based on the environment data (e.g., the user is sitting (IMU) in an internet café (Wi-Fi access point) at a popular downtown location (GPS)). The characterization profile can be sent to the audio device, which can then select an appropriate cardioid pattern to listen to ambient sounds based on the characterization profile. In the multi-sensor-based example above, a cardioid pattern as shown in FIG. 4B may be selected. If the host computing device generates a characterization profile based on environment data collected by one or more sensors (e.g., IMU and GPS) indicating that the user is biking at 25 mph on a 2-lane road in a remote location via one or more sensors, the audio device may select a rear-facing cardioid pattern, as shown in FIG. 4A, to keep the user aware of traffic approaching from the rear. These are merely some of the myriad capabilities of the novel concepts presented herein. It is to be understood that the high level summary presented above is intended to provide the reader with a baseline understanding of some of the novel aspects of the present disclosure and a cursory roadmap to the details that follow. This high level summary in no way limits the scope of the various embodiments described throughout the detailed description and each of the figures referenced above are further described below in greater detail and in their proper scope.

FIG. 1A shows various examples of host computing devices 100, according to certain embodiments. Some examples can include a smart phone 110, a smart watch 120, smart glasses 130 (e.g., or an augmented/virtual reality headset or another head mounted device), and a media player 140. A host computing device may be referred to herein as a "host computer," "host device," "host computing device," "computing device," "computer," or the like, and may include a machine readable medium (not shown) configured to store computer code, such as driver software, firmware, and the like, where the computer code may be executable by one or more processors of the host computing device(s) to control aspects of the host computing device and/or one or more audio devices.

The majority of the embodiments described herein generally refer to host computing device 100 as a smart phone, however it should be understood that a host computing device can be any suitable computing device that can send audio data to an audio device and generate a characterization profile based on environment data (generated and/or received by the host computing device) that may be used to change a cardioid pattern for a plurality of microphones on an audio device communicatively coupled thereto.

Figure 1B:
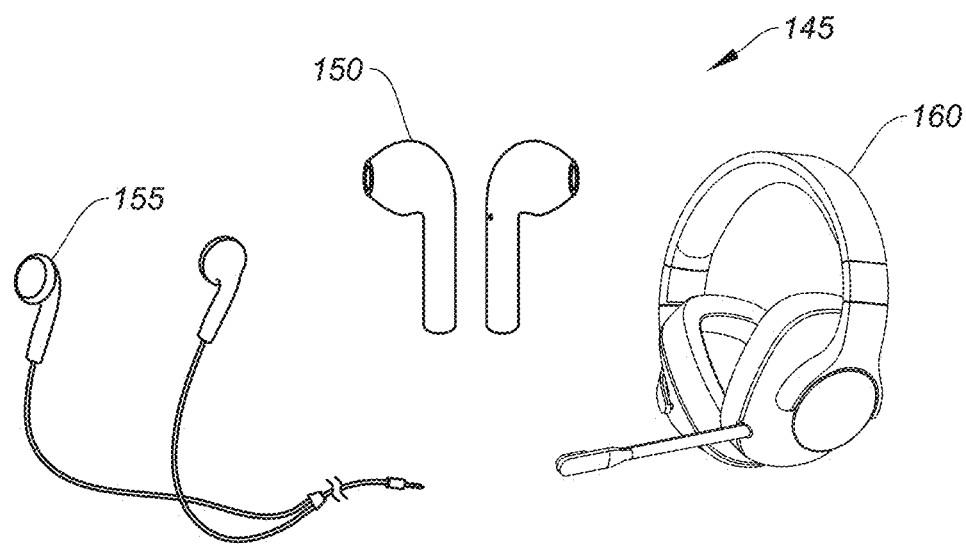
FIG. 1B shows various examples of audio devices, according to certain embodiments.

FIG. 1B shows various examples of audio devices 145, according to certain embodiments. Some audio devices can include wireless earbuds 150, wired earbuds 155, a headset 160, and the like. An audio device does not necessarily have to be a dedicated audio player. For instance, smart glasses 130 (a host computing device) may incorporate one or more electroacoustic transducers to provide audio to a user in addition to video via optical elements (e.g., lenses). The majority of the embodiments described herein generally refer to audio device 145 as wireless earbuds or similar device, however it should be understood that audio device 145 can be any suitable device with at least one electroacoustic transducer and a plurality of microphones with beamforming capabilities, such that the audio device can change a cardioid pattern of the plurality of microphones based on a characterization profile received from a host computing device, according to certain embodiments.

A System for Operating an Audio Device

Figure 2:
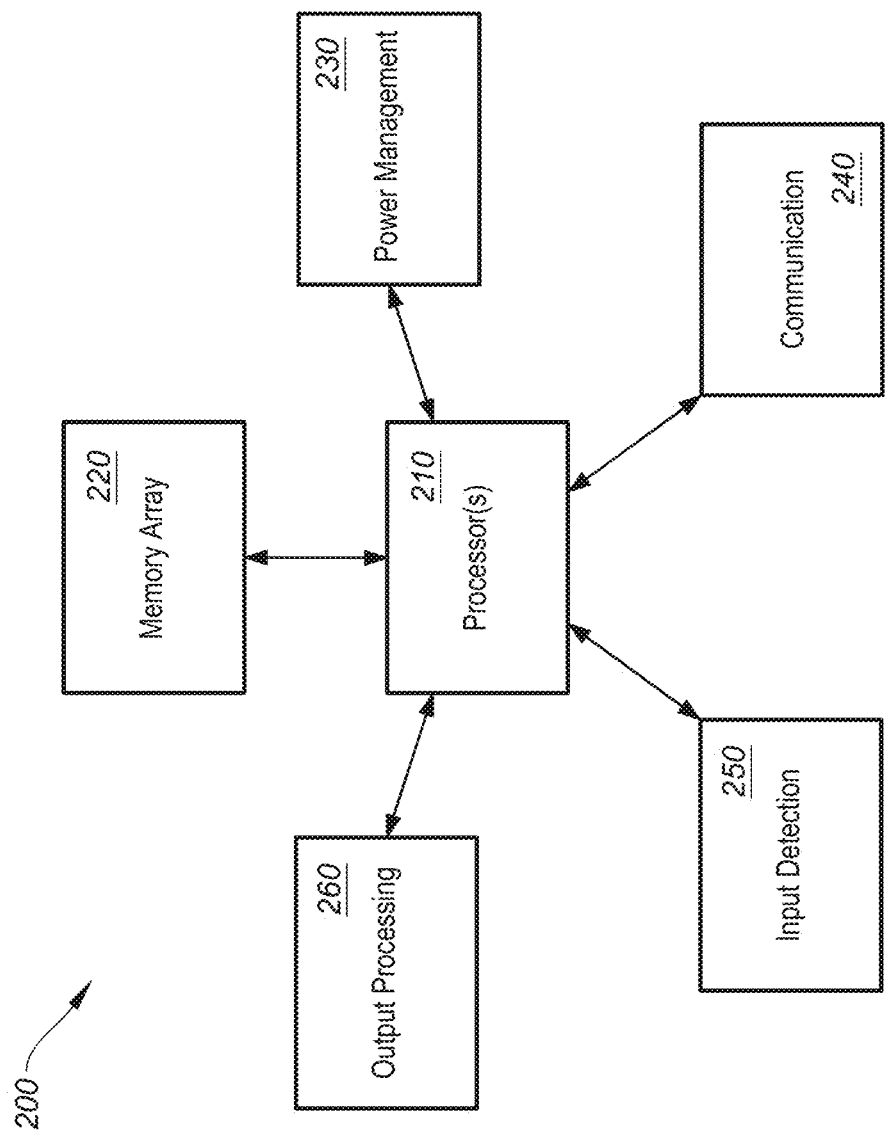
FIG. 2 shows a simplified block diagram of a system configured to operate an audio device, according to certain embodiments.

FIG. 2 shows a simplified block diagram of a system 200 configured to operate an audio device, according to certain embodiments. System 200 may be configured to operate any of the audio devices specifically shown or not shown herein but within the wide purview of possible audio devices encompassed by the present disclosure. System 200 may include processor(s) 210, memory 220, a power management block 230, a communication module 240, an input detection module 250, and an output processing module 260. Each of system blocks 220-260 (also referred to as "modules" or "systems") can be in electronic communication with processor(s) 210 (e.g., via a bus system). System 200 may include additional functional blocks that are not shown or discussed to prevent obfuscation of the novel features described herein. System blocks 220-260 may be implemented as separate modules, or alternatively, more than one system block may be implemented in a single module. For example, input detection block 250 and output processing block 260 may be combined in a single input/output (I/O)

block. In the context described herein, system 200 can be incorporated into any audio device described herein and may be configured to perform any of the various methods of dynamic cardioid adjustment, as described below at least with respect to FIGS. 4A-8, as would be appreciated by one of ordinary skill in the art with the benefit of this disclosure.

In certain embodiments, processor(s) 210 may include one or more microprocessors and can be configured to control the operation of system 200. Alternatively or additionally, processor(s) 210 may include one or more microcontrollers (MCUs), digital signal processors (DSPs), or the like, with supporting hardware and/or firmware (e.g., memory, programmable I/Os, etc.), and/or software, as would be appreciated by one of ordinary skill in the art. Processor(s) 210 can control some or all aspects of the operation of audio device 145 (e.g., system block 220-260). Alternatively or additionally, some of system blocks 220-260 may include an additional dedicated processor, which may work in conjunction with processor(s) 210. For instance, MCUs, μCs, DSPs, and the like, may be configured in other system blocks of system 200. Communications block 250 may include a local processor, for instance, to control aspects of communication with host computing device 100 (e.g., via Bluetooth, Bluetooth LE, RF, IR, hardwire, ZigBee, Z-Wave, Logitech Unifying, or other communication protocol). Processor(s) 210 may be local to the audio device (e.g., contained therein), may be external to the audio device (e.g., off-board processing, such as by a corresponding host computing device), or a combination thereof. Processor(s) 210 may perform any of the various functions and methods (e.g., method 800) described and/or covered by this disclosure in conjunction with any other system blocks in system 200. For instance, processor(s) 210 may process audio data received from the host computing device or from the plurality of microphone on audio device 145, which can include changing an audio cardioid pattern of the plurality of speakers, processing ambient audio data received from the plurality of speakers on the audio device, which can include setting volume levels, equalizing audio, mixing the ambient audio data with audio data (e.g., music, voice, etc.) received from the host computing device, etc. In some implementations, processor 302 of FIG. 3 may work in conjunction with processor 210 to perform some or all of the various methods described throughout this disclosure. In some embodiments, multiple processors may enable increased performance characteristics in system 200 (e.g., speed and bandwidth), however multiple processors are not required, nor necessarily germane to the novelty of the embodiments described herein. One of ordinary skill in the art would understand the many variations, modifications, and alternative embodiments that are possible.

Memory block ("memory") 220 can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM) and/or applications stored in media storage that can be read into memory for execution by processing devices (e.g., processor(s) 210). Software can be implemented as a single program or a collection of separate programs and can be stored in non-volatile storage and copied in whole or in-part to volatile working memory during program execution. In some embodiments, memory 220 may store data corresponding to inputs on the audio device, such as an activation of one or more input elements (e.g., buttons, sliders, touch-sensitive regions, etc.), or the like. In some cases, memory block 220 may store software code configured to operate aspects of method 800.

In certain embodiments, memory 220 can store the various data described throughout this disclosure. For example, memory 220 can store data corresponding to the various audio cardioid patterns or characterization profiles described herein. In some aspects, memory 220 can store sensor data generated by the host computing device and/or by the audio device itself, including IMU, GPS, audio data, access point data, and the like.

Power management system 230 can be configured to manage power distribution, recharging, power efficiency, haptic motor power control, and the like. In some embodiments, power management system 230 can include a battery (not shown), a Universal Serial Bus (USB)-based recharging system for the battery (not shown), and power management devices (e.g., voltage regulators—not shown), and a power grid within system 200 to provide power to each subsystem (e.g., communications block 240, etc.). In certain embodiments, the functions provided by power management system 230 may be incorporated into processor(s) 210. Alternatively, some embodiments may not include a dedicated power management block. For example, functional aspects of power management block 240 (or any of blocks 220-260) may be subsumed by another block (e.g., processor(s) 210) or in combination therewith. The power source can be a replaceable battery, a rechargeable energy storage device (e.g., super capacitor, Lithium Polymer Battery, NiMH, NiCd), or a corded power supply. The recharging system can be configured to charge the power source via corded, wireless, or other power transfer methodology, as would be appreciated by one of ordinary skill in the art with the benefit of this disclosure.

Communication system 240 can be configured to enable wireless communication with a corresponding host computing device (e.g., 110), or other devices, according to certain embodiments. Communication system 240 can be configured to provide radio-frequency (RF), Bluetooth®, Logitech proprietary communication protocol (e.g., Unifying), infrared (IR), ZigBee®, Z-Wave, or other suitable communication technology to communicate with other electronic devices. System 200 may optionally comprise a hardwired connection to the corresponding host computing device. For example, audio device 145 can be configured to receive a USB-type or other universal-type cable to enable bi-directional electronic communication with the corresponding host computing device or other electronic devices. Some embodiments may utilize different types of cables or connection protocol standards to establish hardwired communication with other entities. In some aspects, communication ports (e.g., USB), power ports, etc., may be considered as part of other blocks described herein (e.g., input detection module 150, output processing module 260, etc.). In certain embodiments, communication system 240 may be configured to receive audio data, video data, composite audio/video data, characterization profile data, environment data, or any type of data from host computing device 100. Communication system 240 may incorporate one or more antennas, oscillators, etc., and may operate at any suitable frequency band (e.g., 2.4 GHz), etc. One of ordinary skill in the art with the benefit of this disclosure would appreciate the many modifications, variations, and alternative embodiments thereof.

Input detection module 250 can control the detection of a user-interaction with input elements on audio device 145.

For instance, input detection module 250 can detect user inputs from motion sensors, keys, buttons, dials, touch pads (e.g., one and/or two-dimensional touch sensitive touch pads), click wheels, keypads, microphones, GUIs, touch-sensitive GUIs, image sensor based detection such as gesture detection (e.g., via HMD), audio based detection such as voice input (e.g., via microphone), or the like, as would be appreciated by one of ordinary skill in the art with the benefit of this disclosure. Alternatively, the functions of input detection module 250 can be subsumed by processor 210, or in combination therewith.

In some embodiments, input detection module 250 can detect a touch or touch gesture on one or more touch sensitive surfaces on audio device 145. Input detection block 250 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of audio device 145 may or may not utilize touch detection or touch sensing capabilities.

Input detection block 250 can include touch and/or proximity sensing capabilities. Some examples of the types of touch/proximity sensors may include, but are not limited to, resistive sensors (e.g., standard air-gap 4-wire based, based on carbon loaded plastics which have different electrical characteristics depending on the pressure (FSR), interpolated FSR, etc.), capacitive sensors (e.g., surface capacitance, self-capacitance, mutual capacitance, etc.), optical sensors (e.g., infrared light barriers matrix, laser based diode coupled with photo-detectors that could measure the time of flight of the light path, etc.), acoustic sensors (e.g., piezo-buzzer coupled with microphones to detect the modification of a wave propagation pattern related to touch points, etc.), or the like.

Although many of the embodiments described herein include sensors on the host computing device that detect environment data, some embodiments may employ various sensors and similar capabilities on audio device 145. Accelerometers can be used for movement detection. Accelerometers can be electromechanical devices (e.g., micro-electromechanical systems (MEMS) devices) configured to measure acceleration forces (e.g., static and dynamic forces). One or more accelerometers can be used to detect three dimensional (3D) positioning. For example, 3D tracking can utilize a three-axis accelerometer or two two-axis accelerometers (e.g., in a "3D air mouse)" In some embodiments, gyroscope(s) can be used in lieu of or in conjunction with accelerometer(s) to determine movement or input device orientation.

In some embodiments, input detection block 250 can control the plurality of microphones on audio device 145. For instance, input detection block 250 may configure the one or more microphones to change a cardioid pattern (also referred to as audio beamforming) to correspond to a particular characterization profile, as further described below. In some aspects, the one or more microphones can be configured to detect ambient noise, which processor 210 can process (e.g., invert, EQ, etc.) to cause the one or more speakers on audio device 145 to perform noise cancellation.

In some embodiments, output control module 260 can control various outputs for audio device 145. For instance, output control module 260 may control a number of visual output elements (e.g., mouse cursor, LEDs, LCDs), displays, audio outputs (e.g., speakers), haptic output systems, or the like. Output control module 260 may process audio detected by the plurality of microphones on audio device 145. For instance, output control module 260 may dynamically change an audio cardioid pattern of the plurality of microphones on the audio device; change audio levels, equalization, or mixing arrangements between ambient audio received by the plurality of microphones and audio received from the host computing device, or the like. In some aspects, output control module 260 may work in conjunction with or be subsumed by processor(s) 210. One of ordinary skill in the art with the benefit of this disclosure would appreciate the many modifications, variations, and alternative embodiments thereof.

In certain embodiments, system 200 may incorporate some or all of the system blocks of a host computing device (e.g., system 300). For instance, various embodiments described herein describe host computing devices that utilize one or more sensors to detect environment data via microphones, GPS, IMU, Wi-Fi access points, etc., to determine a characterization profile that is sent to the audio device to be used to configure a cardioid pattern for a plurality of microphones coupled thereto, as further described below. In some aspects, the various sensors described above may be incorporated into audio device 145 such that the various operations performed either by the host computing device (e.g., method 700) and the audio device (e.g., method 800), as described in the embodiments that follow, can all be performed locally on the audio device.

It should be appreciated that system 200 is illustrative and that variations and modifications are possible. System 200 can have other capabilities not specifically described herein. Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Embodiments of the present invention can be realized in a variety of apparatuses including electronic devices (e.g., audio devices) implemented using any combination of circuitry and software. Furthermore, aspects and/or portions of system 200 may be combined with or operated by other sub-systems as required by design. For example, input detection block 250 and/or memory 220 may operate within processor(s) 210 instead of functioning as a separate entity. In addition, the inventive concepts described herein can also be applied to any audio device. Furthermore, system 200 can be applied to any of the audio devices described in the embodiments herein, whether explicitly, referentially, or tacitly described (e.g., would have been known to be applicable to a particular audio-capable device by one of ordinary skill in the art). The foregoing embodiments are not intended to be limiting and those of ordinary skill in the art with the benefit of this disclosure would appreciate the myriad applications and possibilities.

Although certain systems may not expressly discussed, they should be considered as part of system 200, as would be understood by one of ordinary skill in the art. For example, system 200 may include a bus system to transfer power and/or data to and from the different systems therein. In some embodiments, system 200 may include a storage subsystem (not shown). A storage subsystem can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., dynamic cardioid pattern adjustment, etc.) as described herein.

It should be appreciated that system 200 is meant to be illustrative and that many variations and modifications are possible, as would be appreciated by one of ordinary skill in the art. System 200 can include other functions or capabilities that are not specifically described here (e.g., telephony, IMU, GPS, video capabilities, various connection ports for connecting external devices or accessories, etc.). While system 200 is described with reference to particular blocks (e.g., input detection block 250), it is to be understood that these blocks are defined for understanding certain embodiments of the invention and is not intended to imply that embodiments are limited to a particular physical arrangement of component parts. The individual blocks need not correspond to physically distinct components. Blocks can be configured to perform various operations, e.g., by programming a processor or providing appropriate processes, and various blocks may or may not be reconfigurable depending on how the initial configuration is obtained. Certain embodiments can be realized in a variety of apparatuses including electronic devices implemented using any combination of circuitry and software. Furthermore, aspects and/or portions of system 200 may be combined with or operated by other sub-systems as informed by design.

System for Operating a Host Computing Device

Figure 3:
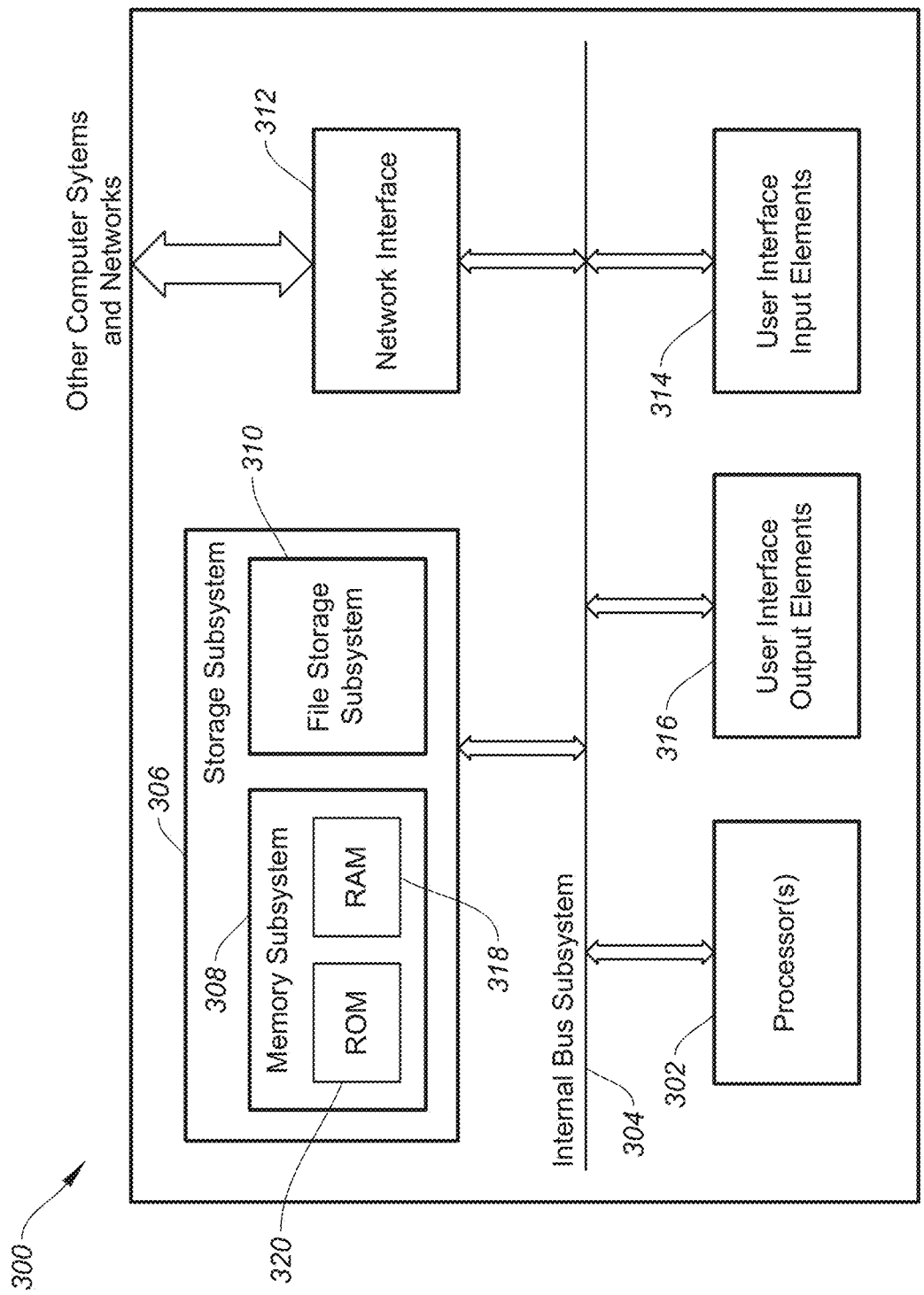
FIG. 3 shows a simplified block diagram of a system configured to operate a host computing device, according to certain embodiments.

FIG. 3 shows a simplified block diagram of a system 300 configured to operate a host computing device 100, according to certain embodiments. System 300 can implement some or all functions, behaviors, and/or capabilities described above that would use electronic storage or processing, as well as other functions, behaviors, or capabilities not expressly described. System 300 includes a processing subsystem (processor(s)) 302, a storage subsystem 306, user interfaces 314, 316, and a communication interface 312. System 300 can also include other components (not explicitly shown) such as a battery, power controllers, and other components operable to provide various enhanced capabilities. In various embodiments, System 300 can be implemented in a host computing device, such as a smart phone, wearable smart device, media device, head-mounted device, or the like.

Processor(s) 302 can include MCU(s), micro-processors, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of methods (e.g., method 700), portions thereof, etc., as described throughout this disclosure. In some cases, processing (e.g., analyzing data, operating system blocks, controlling input/output elements, etc., can be controlled by processor(s) 302 alone or in conjunction with other processors (e.g., processor 210, cloud-based processors, etc.), as would be appreciated by one of ordinary skill in the art with the benefit of this disclosure.

Storage subsystem 306 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 308 including random access memory (RAM) 318 such as dynamic RAM (DRAM), static RAM (SRAM), synchronous dynamic RAM (e.g., DDR), or battery backed up RAM or read-only memory (ROM) 320, or a file storage subsystem 310 that may include one or more code modules. In some embodiments, storage subsystem 306 can store one or more applications and/or operating system programs to be executed by processing subsystem 302, including programs to implement some or all operations described above that would be performed using a computer. For example, storage subsystem 306 can store one or more code modules for implementing one or more method steps (e.g., methods, 700, 800) described herein.

A firmware and/or software implementation may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc. These descriptions of software, firmware, storage mediums, etc., apply to systems 200 and 300, as well as any other implementations within the wide purview of the present disclosure. In some embodiments, aspects of the invention (e.g., detecting environment data, determining a characterization profile of the environment data, dynamically adapting a cardioid pattern of a plurality of microphones based on the characterization profile, etc.) may be performed by software stored in storage subsystem 306, stored in memory 220 of audio device 145, or both. One of ordinary skill in the art with the benefit of this disclosure would appreciate the many modifications, variations, and alternative embodiments thereof.

Implementation of the techniques, blocks, steps and means described throughout the present disclosure may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module may comprise sets of instructions (codes) embodied on a computer-readable medium that directs a processor of a host computing device to perform corresponding actions. The instructions may be configured to run in sequential order, in parallel (such as under different processing threads), or in a combination thereof. After loading a code module on a general purpose computer system, the general purpose computer is transformed into a special purpose computer system.

Computer programs incorporating various features described herein (e.g., in one or more code modules) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 306 can also store information useful for establishing network connections using the communication ("network") interface 312.

System 300 may include user interface input devices 314 elements (e.g., touch pad, touch screen, scroll wheel, click wheel, dial, button, switch, keypad, microphones, etc.), as well as user interface output devices 316 (e.g., video screen, indicator lights, speakers, headphone jacks, virtual- or augmented-reality display, etc.), together with supporting electronics (e.g., digital to analog or analog to digital converters, signal processors, etc.).

Processing subsystem 302 can be implemented as one or more processors (e.g., integrated circuits, one or more single core or multi core microprocessors, microcontrollers, central processing unit, graphics processing unit, etc.). In operation, processing subsystem 302 can control the operation of computing device 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 306. Through programming, processing subsystem 302 can provide various functionality for computing device 300. Processing subsystem 302 can also execute other programs to control other functions of computing device 300, including programs that may be stored in storage subsystem 306. In some aspects, processing subsystem 302 can perform analyzing environmental data (e.g., from microphones, GPS, IMU, etc.), generating characterization profiles of the user's environment based on the environmental data, determining a suitable audio cardioid pattern for the speaker(s) on the audio device (this is typically done on the audio device, but the host computing device may perform this function as well), and the like.

Communication interface (also referred to as network interface) 312 can provide voice and/or data communication capability for system device 300. In some embodiments, communication interface 312 can include radio frequency (RF) transceiver components for accessing wireless data networks (e.g., Wi-Fi network; 3G, 4G/LTE; etc.), mobile communication technologies, components for short range wireless communication (e.g., using Bluetooth communication standards, NFC, etc.), other components, or combinations of technologies. In some embodiments, communication interface 312 can provide wired connectivity (e.g., universal serial bus (USB), Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently. Communication interface 312 may be configured to access Wi-Fi access points and corresponding data (e.g., access point names, location information, etc.). Communication interface 312 may be configured to enable mono-directional or bidirectional communication between host computing device 100 and audio device 145. For instance, communication interface 312 can be used to send environmental data, characterization profile data, audio data, video data, or any suitable data from a mobile phone 110 to wireless earbuds 150.

User interface input elements 314 may include any suitable audio device elements (e.g., microphones, buttons, touch sensitive elements, etc.), as would be appreciated by one of ordinary skill in the art with the benefit of this disclosure. User interface output elements 316 can include display devices (e.g., LCD), audio devices (e.g., speakers), haptic devices, etc. In typical embodiments, three or more microphones are typically used in order to perform audio beamforming to change an audio cardioid pattern, as described below. For instance, with earbuds, each earbud typically employs at least one speaker directed to the ear of a user and at least three microphones. The earbuds may operate independently or in conjunction with one another in terms of cardioid pattern selection, audio processing, etc. Note that user interface input and output devices are shown to be a part of system 300 as separate systems, but some embodiments may incorporate them as a single integrated system, or subsumed by other blocks of system 300. One of ordinary skill in the art with the benefit of this disclosure would appreciate the many modifications, variations, and alternative embodiments thereof.

In some aspects, interface input elements 314 and/or output elements 316 can include a number of sensors including a plurality of microphones, GPS infrastructure, an IMU, or the like. In some cases, other capabilities (e.g., lighting control, mixing levels, etc.) that are not expressly described herein can be controlled by input/output elements 314/316.

In certain embodiments, accelerometers (of an IMU) can be used for movement detection. Accelerometers can be electromechanical devices (e.g., micro-electromechanical systems (MEMS) devices) configured to measure acceleration forces (e.g., static and dynamic forces). One or more accelerometers can be used to detect three dimensional (3D) positioning. For example, 3D tracking can utilize a three-axis accelerometer or two two-axis accelerometers. In some cases, accelerometers can be used to track movement of a user, whether they are walking (e.g., based on their gait), driving in a car, running, stationary, etc., which can be used as environment data to determine a characterization profile, as described below. In some embodiments, gyroscope(s) can be used in lieu of or in conjunction with accelerometer(s) to determine movement or host computing device (or audio device) orientation.

It will be appreciated that system 300 is illustrative and that variations and modifications are possible. A host computing device can have various functionality not specifically described (e.g., voice communication via cellular telephone networks) and can include components appropriate to such functionality. While the system 300 is described with reference to particular blocks, it is to be understood that these blocks are defined for convenience of description and are not intended to imply a particular physical arrangement of component parts. For example, processing subsystem 302, storage subsystem 306, user interface elements 314, 316, and communications interface 312 can be in one device or distributed among multiple devices. Further, the blocks need not correspond to physically distinct components. System blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Host computing devices or even audio devices described herein can be implemented using some or all aspects of system 300.

Dynamic Adjustment of an Audio Device Based on Environmental Data

Aspects of the invention are related to the dynamic adjustment of an audio device based on an environment of a user that can be used to enhance the user's audio experience. For instance, a person working in an office environment may want to reduce background noise, but remain aware of when a colleagues sitting across a table is speaking to him. In certain embodiments, a host computing device and audio device may be configured to attenuate background noise via noise cancelling on the audio device, while allowing human speech to pass through unattenuated and, in some cases, amplified by adjusting a directional focus of a plurality of microphones on the audio device. This is but one example of many applications of the novel systems and methods described herein.

At a high level of abstraction, this process can be performed in three steps: (1) the host computing device (e.g., smart phone) uses one or more sensors in real-time to acquire environment data corresponding to an environment that the user is in (e.g., ambient sounds detected by one or more microphones on the host computing device; a motion of the user via IMU to determine a user's activity (e.g., sitting, walking, biking etc.); a location of a user via GPS or Wi-Fi access point data) and analyze that data (e.g., using artificial intelligence) to determine a characterization profile that corresponds to the environment data based on the detected aspects of the surrounding environment (e.g., user is in a gym, a café, an office environment, in traffic, outdoors, background noise, etc.); (2) the host computing devices sends the characterization profile and/or the environment data to the audio device (e.g., wireless ear bud(s)); and (3) based on the characterization profile and/or the environment data, the earbud(s) dynamically make adjustments to enhance the audio heard by the user. Such enhancements can include adjusting a plurality of microphones (e.g., beamforming by changing an audio cardioid pattern of the plurality of microphones) to amplify sound coming from the front, rear, or omni-directionally; adjusting a microphone to capture ambient sounds (omni-directionally or directionally) for noise cancellation; adjusting digital audio filters to filter out background noise; adjust an equalizer to enhance certain sounds (e.g., voice frequencies) for a better fidelity, or the like, as further described in the embodiments that follow. In some cases, changing the audio cardioid pattern can include changing a phase between each of the plurality of microphones, which can change a shape of an area around the user that gets detected more optimally.

FIG. 4A shows a scene 400 where a user 410 has an audio device 412 that is configured with a rear facing cardioid pattern 402, according to certain embodiments. In scene 400, user 410 is riding a bicycle along a roadway and listening to music wirelessly transmitted from a host computing device (e.g., smart phone 110—not shown) to an audio device (e.g., wireless earbuds 412). Earbuds 412 may be similar to earbuds 150 of FIG. 1. As noted above, it is to be assumed that each embodiment of the audio device described herein (and in each embodiment described throughout this disclosure) can include at least three microphones on each earpiece (e.g., each earbud) to perform audio beamforming and achieve a particular cardioid pattern, as further described below.

Referring back to FIG. 4A, user 410 may wish to listen to his music at a loud volume, which is likely to "drown out" other ambient sounds around the user. This may be preferable to the user to help focus on his riding, however aspects of the invention allow user 410 to still hear important ambient sounds such as vehicles approaching from behind, voices from behind (e.g., passing riders indicating that they are passing), or emergency vehicle sirens, for instance. Aspects of the invention can allow the user to maintain the chosen audio programming (e.g., music, telephone call, podcast, etc.) on the audio device and still keep the user informed of any vehicles, riders, or other sounds approaching from the rear by audio beamforming a plurality of microphones on the audio device (e.g., on each earbud) to be directed backwards, or at 180 degrees from the direction that the user is facing. The rear-facing beamforming can be represented by an audio cardioid pattern 402, which shows a pattern for the left earbud and right earbud. Thus, the amplified sounds coming from the rear can be passed-through (e.g., mixed with music, replace the music, etc.), or an indication that there is an approaching sound source from the rear (e.g., when above a certain threshold dB), which may simply be a beep or tone sequence, etc. In some aspects, an audio soundscape played by the one or more speakers of the audio device can be manipulated (e.g., via panning) so that a beep or series of tones may directionally indicated a direction that a certain sound is detected. Although the embodiments described and shown herein treat each earbud separately (e.g., separate, non-overlapping cardioid patterns), some embodiments may combine cardioid patterns by beamforming both sets of earbuds for more sophisticated beamforming options including narrower, targeted ranges and increased fidelity and targeting precision. In some cases, the microphones on both sides of the earbuds, which can pass audio data between each other, can selectively pick up only audio that the user wants to hear and amplify those sounds, while reducing other noises. For instance, if a user is on a phone call with a lot of wind noise on the left side but not on the right side, some embodiments can switch the ear buds to increase or maintain amplification for ambient sounds detected by the right ear bud and reduce or eliminate amplification for ambient sounds detected from the left ear bud. In some cases, this can dynamically change as the user orients themselves in different ways relative to the direction of the wind, which can be detected via IMU, different audio profiles from the left/right side, etc., as would be appreciated by one of ordinary skill in the art with the benefit of this disclosure. Typically, audio is not completely blocked out in areas that the plurality of microphones are not directed to; rather those areas may have more "focus" and greater amplification while other areas may have less or no amplification.

In some manual modes of operation, user 410 may manually select a cardioid pattern for the audio device 412 to focus the plurality of microphones behind the user while riding. However, exemplary embodiments can do this automatically and dynamically based on a detected environment of the user. For example, a smart phone (110) can include a host of sophisticated sensory and processing resources that can be leveraged to help determine a type of environment the user is in and, in some cases, how the user is likely interacting with that environment. Smart phone 110 (or any suitable host computing device) may include a GPS, IMU, one or more microphones, biometric readers, weather data access, and wireless communication capabilities, among other sensing capabilities, that can each generate data that can be generally referred to as "user environment data." The host computing device may analyze some or all of the available user environment data to determine a "characterization profile" that, when received by the audio device, can be used to determine how to configure aspects (e.g., audio cardioid pattern) of the audio device.

In some aspects, host computing device (e.g., smart phone 110) may run software (e.g., processor(s) 302 executing software stored on storage subsystem 306) that polls the GPS and determines that the user is traveling at a relatively constant 20 mph along a two-lane road in a remote location. Other informational layers may be gleaned from the GPS data including local or regional definitions (e.g., the user is on a designated trail or park, the user is in a sparsely populated rural area, the user is in a densely populated commercial area, the user is in a building, etc.); speed limit designations that can help determine if the user is in a vehicle, on a bicycle, running, etc., based on the user's speed relative to the speed limit; whether the user is moving linearly or more erratically, which may help determine if the user on a road or on a roadside trail; whether the user has a destination programmed on the GPS software, etc., all of which can be used to help determine not only a mode of travel of the user, but also inform how an audio device can be better adapted to the current environment. For example, if the host computing device determines that the user is biking along a road, as shown in FIG. 4A, then the audio device (after receiving the corresponding characterization profile) may dynamically configure its microphones with a rear-facing audio cardioid pattern as a biker may want to know when something is approaching from behind. If the host computing devices determines that the user is driving (e.g., because the user is traveling at 55 mph), then having an omnidirectional cardioid pattern may be applied to ensure that the user knows when a person in the vehicle is speaking to him. In some aspects, noise cancelling may be employed to reduce road noise, white noise, and the like, except for sounds originating from behind the user. In further embodiments, a frequency analysis can be employed to determine a type of sound being detected so that unwanted sound sources, even those originating from behind the user in the amplified region, can be damped, while other sound sources (e.g., vehicle noise and a human voice) can be amplified and can pass through and mix with or replace the current audio (music). For example, road noise from a vehicle is typically about 1 kHz and intelligible human speech is about 2-4 kHz. Some embodiments may employ a digital audio filter to dampen all sound behind the user that is below 900 Hz and above 4 kHz. Any suitable frequency bands (e.g., emergency vehicle sirens) can be damped or amplified in any manner using filtering techniques, whether in the amplified cardioid pattern region or generally, as would be appreciated by one of ordinary skill in the art with the benefit of this disclosure.

In some embodiments, host computing device (e.g., smart phone 110) may run software (e.g., processor(s) 302 executing software stored on storage subsystem 306) that polls the IMU to determine how the user is moving. In the example of FIG. 4A, the IMU (e.g., an accelerometer) may provide data that is indicative of the user moving at a relatively constant rate (e.g., small changes in acceleration) and with a highly cyclical gait that corresponds to a consistent up and down motion that a bike rider may have while pedaling. In some aspects, the IMU (e.g., an gyroscope) may provide data corresponding to a user's orientation. In the case where the host computing device is a head-mounted display, the host computing device may determine which way the user is looking by the direction that the user's head is facing. In some cases, the user's facial orientation may be determined indirectly by certain detected motions of the user's body (e.g., a smart phone is the user's pocket detects when the user's torso turns by a certain threshold angle (e.g., 40 degrees)), which may be indicative of the user turning their head. In some aspects, data from multiple sources can be combined to better determine both the user's environment and their mode of travel. For instance, a GPS may show a user traveling at 30 mph along a road, which may possible in a car or on a bicycle (e.g., traveling downhill). The IMU may provide greater confidence that the user is biking instead of driving in a vehicle based on the cyclic gait while the user is pedaling.

In some embodiments, host computing device (e.g., smart phone 110) may run software that polls the one or more microphones on the host computing device to listen to ambient audio around the user to help determine aspects of the user's environment. For example, sounds such as high levels of road noise, engine noise, and/or wind noise may indicate that the user is traveling in a vehicle. The amount of road/engine/wind noise may also provide clues as to how fast the user is going, the type of vehicle being used (e.g., motorcycles and bicycles may have higher ambient road/ engine/wind noise than a car with its windows up). Footsteps, wind noise, machinery, white noise, etc., can be detected via one or more microphones on the host computing device, which can add to the user environment data. The detection of human voices and the fidelity of the signal may help indicate whether a user is indoors or outdoors, in a crowd or a small group of people, in a city center or a remote area, or the like. As described above, the audio data can be used in conjunction with other sensing resources to increase a confidence level that a user is in a particular environment, which can be provided to the audio device as a characterization profile, as described above. In some embodiments, a Voice Activity Detector (VAD) can be used by the host computing device, the audio device, or a combination thereof to detect when a human voice is detected and whether the voice is directed to the user or not.

In some embodiments, a host computing device (e.g., smart phone 110) may run software that accesses a network interface (312) to detect Wi-Fi access points. In some cases, environmental information can be gleaned from the name of the Wi-Fi access point. For instance, an access point that shares the name of a commercial establishment can provide some indication of the user's setting (e.g., a café, an office, a residence, etc.), which can be used to determine an appropriate audio cardioid pattern. Other types of sensor data can be used to gather user environment data and is not limited to the examples given here. For instance, user biometric data (e.g., via a smart watch) may provide heartbeat data, breathing data, etc., which can be used to determine what the user is doing, their condition, etc., which can inform how to characterize the user's environment in a characterization profile.

In certain cases, once the user environment data (e.g., audio data, GPS data, IMU data, Wi-Fi access point data, etc.) is collected and analyzed, the characterization profile of the user's surrounding environment can be determined based on the user environment data. The characterization profile may include cross-referencing the various types of user environment data separately and collectively against a look-up table or template to determine a particular characterization profile to report to the audio device. In some aspects, the host computing device may use artificial intelligence and machine learning to identify behaviors and activities that the user typically partakes in, audio device preferences that the user may like in certain circumstances, locations, etc., and the like, to determine how to formulate the characterization profile accordingly. Once the characterization profile is sent from the host computing device to the audio device, the audio device may then dynamically adapt the audio cardioid pattern of its plurality of microphones based on the received characterization profile of the user's surrounding environment. Any suitable audio cardioid pattern may be applied, including the three types shown and described herein, as well as other types which may include more directions, different dimensions, etc., as would be appreciated by one of ordinary skill in the art with the benefit of this disclosure. It should be noted that although the embodiments shown and described herein generally refer to a process where the host computing device performs the acquisition of sensor data and determination of a suitable characterization profile, it would be understood by those of ordinary skill in the art with the benefit of this disclosure that some devices (e.g., an HMD, smart glasses, etc., that have audio devices built in) may have all of the necessary sensory capabilities and processing bandwidth to perform all of the various operational steps to analyze a user's environment and adapt an audio cardioid pattern of a plurality of microphones on the device to preferentially amplify, filter, and modify sounds sourced from a particular direction in the myriad ways described in this disclosure (see, e.g., FIGS. 4A-8).

The characterization profile can be realized in a number of different ways. For instance, a characterization profile can be a table that describes the scenario/factors and may include a decision. For example, a GPS may show that a user is indoors, a microphone with artificial intelligence (AI) may determine that there is a lot of people talking in the background (e.g., in a café or office), and IMU (e.g., accelerometer) may indicated some head/body movement, and a VAD may indicate that there is "dominant speech" in front of the person, so the table may indicate that "front" aware (e.g., microphones directed forward) will best pick up the sound of the person speaking to the user. In some cases, where the VAD does not pick up any activity, the user may be focused on their work and the characterization profile may reflect that an omnidirectional aware or rear aware would be an appropriate setting. In some aspects, a GPS may indicate that the user is outdoors, and the characterization profile may indicate that a rear aware configuration is preferred when an IMU detects motion (e.g., cycling, running, etc.), or that omnidirectional is preferred when the IMU detects that the user is stationary (e.g., sitting at a park bench).

In some aspects, a direct location assessment can be performed. For instance, based on GPS and map data, the system can deduce the type of building that the user is in, which can inform the appropriate cardioid pattern to apply to the microphones of the audio device. In some aspects, direct AI environmental detection can be used. For instance, a host computing device microphone can be used to determine the user's environment, as described above. Based on AI voice model training and audio captured by the microphone, the system can determine that the user is in a gym, in traffic, or other trained sounds that can help the system determined an appropriate cardioid pattern for the audio device.

FIG. 4B shows a user 450 with an audio device 452 configured with a front facing cardioid pattern 404, according to certain embodiments. In scene 440, user 450 is sitting in a coffee shop and watching and listening to a video podcast on her host computing device (e.g., mobile phone 110), which wirelessly sends the audio portion of the podcast to the user's audio device (e.g., wireless earbuds 452). The user's friend 460 is sitting across from her and periodically talks to user 450. Earbuds 452 may be similar to earbuds 150 of FIG. 1 and can include at least three microphones on each audio device to perform audio beamforming and achieve a particular cardioid pattern, as further described below.

Referring back to FIG. 4B, user 450 may wish to listen to her podcast at a loud enough volume to overcome the ambient white noise in the room (e.g., people moving about, people talking at a distance away, equipment noise, etc.) so that she can pay closer attention to the podcast. Certain embodiments allow user 450 to maintain high volume and audio fidelity (and in some cases with noise cancellation to further attenuate background noise), while still allowing her friend's voice to pass through unattentuated to get her attention, as further described below.

In certain embodiments, host computing device 100 can automatically and dynamically change performance characteristics (e.g., an audio cardioid pattern) of a plurality of microphones on an audio device based on a detected environment of the user. For example, smart phone 110 (or any suitable host computing device) may include a GPS, IMU, one or more microphones, and wireless communication capabilities, among other sensing capabilities, that can each generate data that can be generally referred to as "user environment data." The host computing device may analyze some or all of the available user environment data to determine a "characterization profile" that, when received by the audio device, can be used to determine how to configure aspects (e.g., audio cardioid pattern) of the audio device.

In some aspects, host computing device (e.g., smart phone 110) may run software (e.g., processor(s) 302 executing software stored on storage subsystem 306) that polls the GPS and determines that user 450 is located at a café and stationary (e.g., not moving from the present location for a period of time (e.g., 5 min)). In some embodiments, smart phone 110 may run software that polls the IMU and determines that the user is stationary (e.g., based on acceleration and/or gyroscope data) and possibly sitting based on certain movement characteristics (e.g., shifting, repositioning, etc.). Smart phone 110 may run software that polls the microphone(s) on the smart phone and determines that the background noise includes large amounts of human speech, music, and high levels of background noise. Smart phone 110 may run software that polls the network interface and determines that the name of the Wi-Fi access point indicates that the location is a café.

In certain embodiments, the user environment data can be analyzed separately and in combination to glean information about the location of the user to generate a characterization profile of the user's surrounding environment in the manner described above. Once the audio device receives the characterization profile from the host computing device, the audio device may then dynamically adapt the audio cardioid pattern of its plurality of microphones based on the received characterization profile of the user's surrounding environment. Referring back to FIG. 4B, user 450 can now enjoy her podcast without being disturbed by background noise, but will still be able to hear user 460 when she speaks because the audio cardioid pattern 404 is amplifying sounds coming from in front of user 450 (e.g., sounds at approximately −60 to +60 degrees with a 0 degree reference being directly in front of user 450 and audio device 452). In some cases, only certain frequencies may be amplified (e.g., speech frequencies) while others are attenuated so that background noise that come from the front of the user that is not within a particular speech frequency band will still be attenuated. User 460's speech can be mixed to a similar level as the podcast audio, it may momentarily replace the podcast audio, or some indication may be given that user 460 is speaking (e.g., beep or sequence of tones). One of ordinary skill in the art with the benefit of this disclosure would appreciate the many modifications, variations, and alternative embodiments thereof.

Figure 4C:
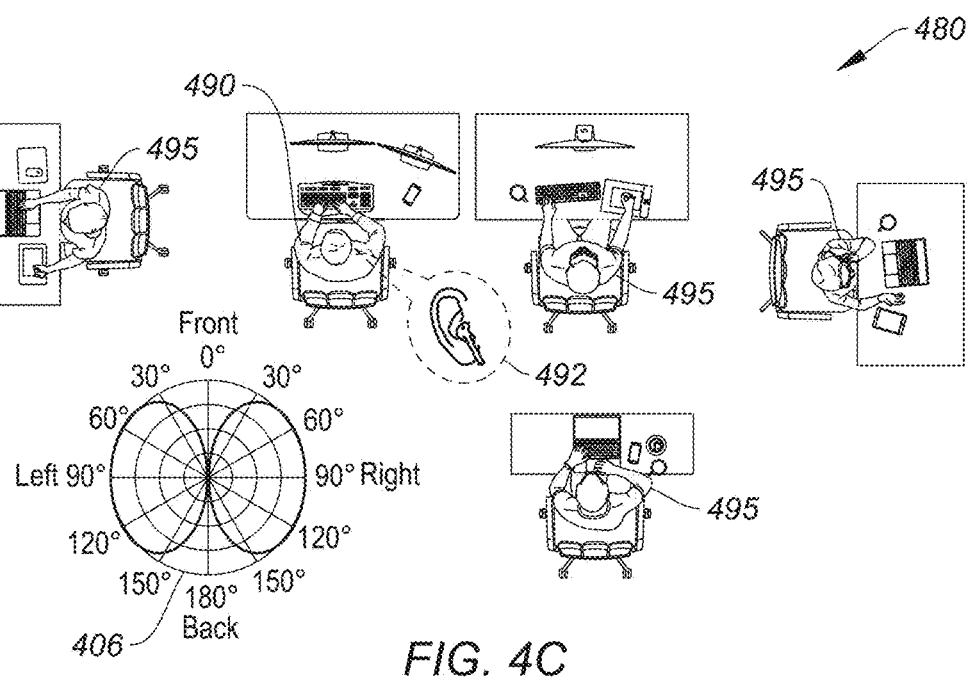
FIG. 4C shows an office worker with an audio device configured with an omnidirectional cardioid pattern, according to certain embodiments.

FIG. 4C shows a user 490 with an audio device (e.g., wireless earbuds 492) configured with an omnidirectional cardioid pattern 406, according to certain embodiments. In scene 480, user 490 is sitting in an office environment and working on a desktop computer. Many coworkers 495 are situated around user 490 in an open floor-styled office arrangement and there is a lot of activity in his general area. The various coworkers 495 may periodically talk to user 490 or his other coworkers 495. Aspects of the invention allow user 490 to employ noise cancelling so that he can work with reduced background noise and at the same time be able to hear people speak to him or around him with sufficient volume and clarity, as described in the description that follows. Earbuds 492 may be similar to earbuds 150 of FIG. 1 and can include at least three microphones on each audio device to perform audio beamforming and achieve a particular cardioid pattern, as further described below.

In certain embodiments, host computing device 100 (e.g., smart watch 120) can automatically and dynamically change performance characteristics (e.g., an audio cardioid pattern) of a plurality of microphones each of one or two wireless earbuds 492 based on a detected environment of the user. For example, smart watch 120 (or any suitable host computing device) may include a GPS, IMU, one or more microphones, and wireless communication capabilities, among other sensing capabilities, to capture user environment data. The host computing device may analyze some or all of the available user environment data to determine a characterization profile that, when received by the audio device, can be used to determine how to configure aspects (e.g., audio cardioid pattern) of the audio device.

In some aspects, the host computing device (e.g., smart watch 120) may run software (e.g., processor(s) 302 executing software stored on storage subsystem 306) that polls the GPS and determines that user 490 is located in an office building and is stationary (e.g., not moving from the present location for a period of time (e.g., 5 min)). In some embodiments, smart watch 120 may run software that polls the IMU and also determines that the user is stationary (e.g., based on acceleration and/or gyroscope data) and possibly sitting based on certain movement characteristics (e.g., shifting, repositioning, etc.). In some aspects, smart watch 120 may run software that polls the microphone(s) on the smart phone and determines that present background noise includes large amounts of human speech, operating equipment (e.g., printers, keyboard "clicking," etc.), and moderate levels of background noise (e.g., foot traffic, chair movement, white noise, etc.). In further embodiments smart watch 120 may run software that polls the network interface and determines that the name of the Wi-Fi access point indicates that the location is a company office building (e.g., "ABC Industries Wi-Fi").

In certain embodiments, the user environment data can be analyzed separately and in combination to glean information about the location of the user to generate a characterization profile of the user's surrounding environment in the manner described above. Once the audio device receives the characterization profile from the host computing device, the audio device may then dynamically adapt the audio cardioid pattern of its plurality of microphones and instantiate digital audio filtering based on the received characterization profile of the user's surrounding environment. Referring back to FIG. 4C, user 490 can now work with attenuated background noise via noise cancellation, but can still hear human speech at higher audio levels because the audio cardioid pattern 406 (omnidirectional pattern) is amplifying speech frequencies coming from all angles, but attenuating sound that is not in a human speech frequency spectrum. In some aspects, the digital audio filter may limit speech to a narrow bandwidth that still retains intelligible speech to ensure that most of the background noise (which may overlap speech frequencies) are satisfactorily attenuated. Thus, user 490 can work with a substantially reduced background noise via the noise cancelling, but will still be able to hear ambient speech directed to him or around him at sufficient audio levels. One of ordinary skill in the art with the benefit of this disclosure would appreciate the many modifications, variations, and alternative embodiments thereof.

Automatically Switching Between Cardioid Patterns Based on Temporary Conditions

In the various embodiments described above (e.g., FIGS. 4A-4C), a host computing device uses one or more sensors to collect and analyze user environment data to determine a user's setting, environment conditions (e.g., ambient sound), and the like, and then generates a characterization pattern based on the user environment data that it sends to an audio device, which it may use to adapt its operational characteristics (e.g., audio cardioid pattern for a plurality of microphones on the audio device, digital audio filters, noise cancellation/suppression, etc.). In some circumstances, the user environment may not change, but certain events may occur which can render a current audio cardioid pattern less effective, or digital audio filter counterproductive to the goals of the user. In those cases, some embodiments can cause an audio device to temporarily change an audio cardioid pattern, digital audio filter, or the like, to better accommodate those events to maintain the goals of the user.

Figure 5A:
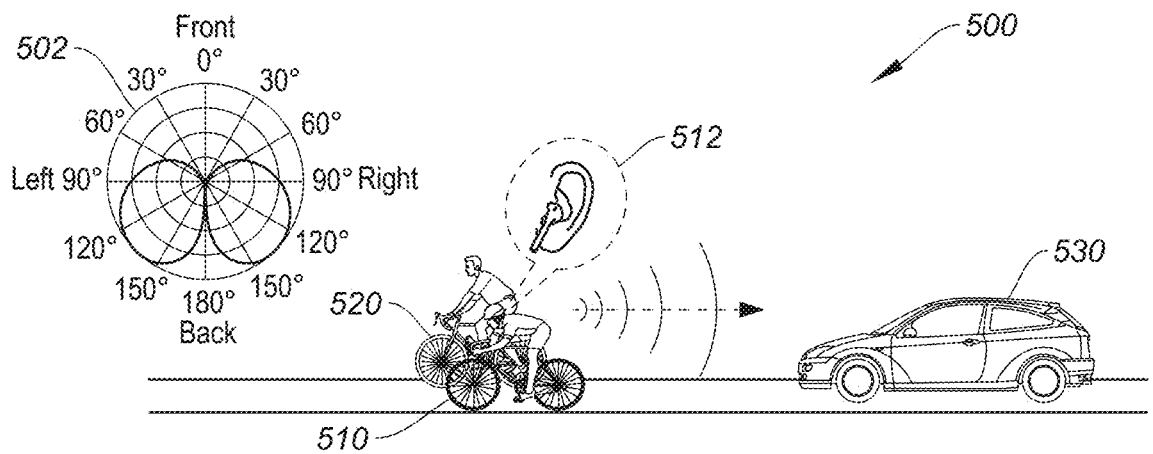
FIG. 5A shows a biker using an audio device configured with a rear facing cardioid pattern, according to certain embodiments.
Figure 5B:
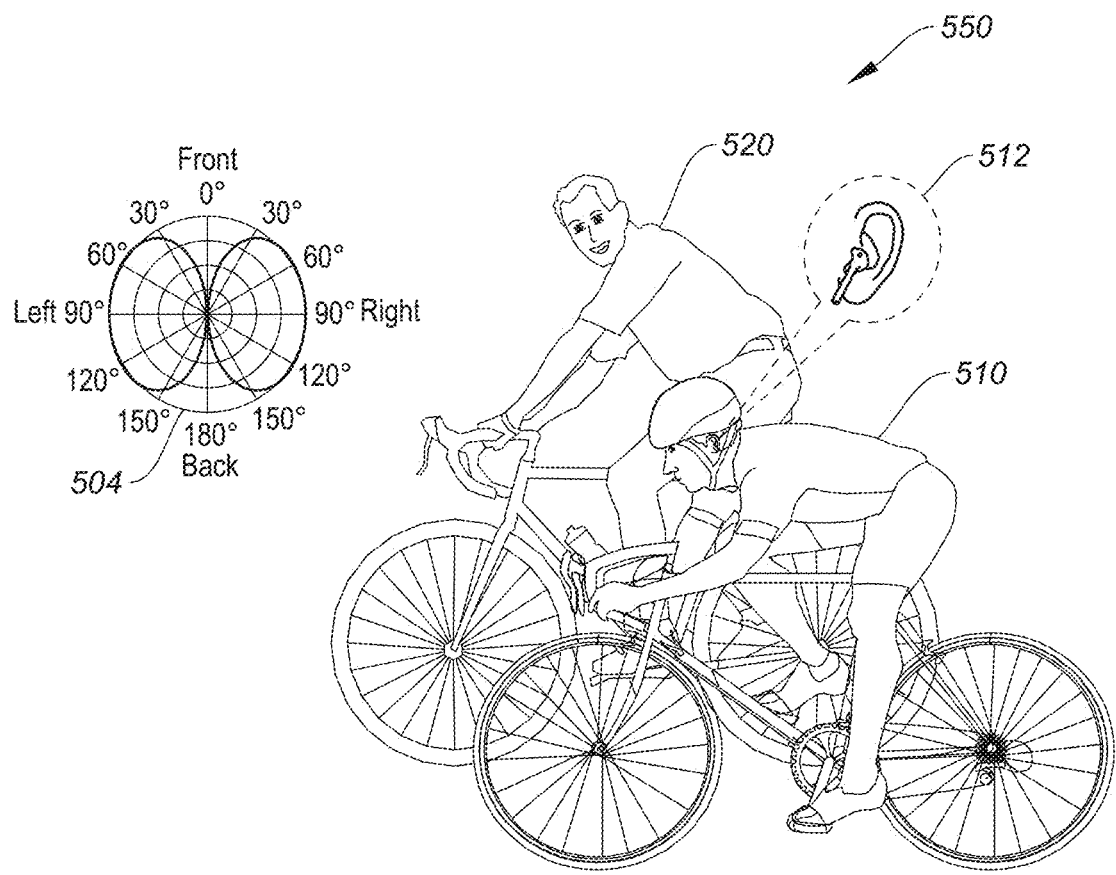
FIG. 5B shows a biker using an audio device configured with an omnidirectional cardioid pattern, according to certain embodiments.

For instance, FIG. 5A presents a scenario where a first biker 510 may be listening to music with an audio cardioid pattern 502 directed behind him so that sounds from vehicles 530 approaching from behind are amplified and included into the first biker's audio mix. Additionally, a second biker 520 is riding alongside the first biker and begins speaking to him. Aspects of the invention allow the audio device to momentarily change the audio cardioid pattern to accommodate multiple goals including, in this case, (1) amplifying sounds from approaching vehicles from behind using a rear-facing audio cardioid pattern 502 (and in some cases, digital audio filtering to only amplify certain frequencies, such as vehicle noise and road noise), and (2) momentarily changing to a new omnidirectional cardioid pattern 504 when human speech is detected (e.g., from user 520) to better amplify biker 520's speech, as shown in FIG. 5B. When biker 520 stops talking, the audio cardioid pattern of the audio device may default back to audio cardioid pattern 502. In some embodiments, the characterization profile generated by the host computing device may incorporate data corresponding to the setting and environment conditions of biker 510, including his location (e.g., a remote two-lane road), his mode of movement (e.g., via bicycle), his audio environment (e.g., road noise, white noise, human speech, etc.), and the like, and audio device 512 may be configured to change between multiple audio cardioid patterns based on the characterization profile and the current audio received by the audio device's multiple microphones including an approaching vehicle 530 from the rear, human speech from another person (biker 520), or other sound source designated to influence a current audio cardioid pattern accordingly. One of ordinary skill in the art with the benefit of this disclosure would appreciate the many modifications, variations, and alternative embodiments thereof.

Figure 6A:
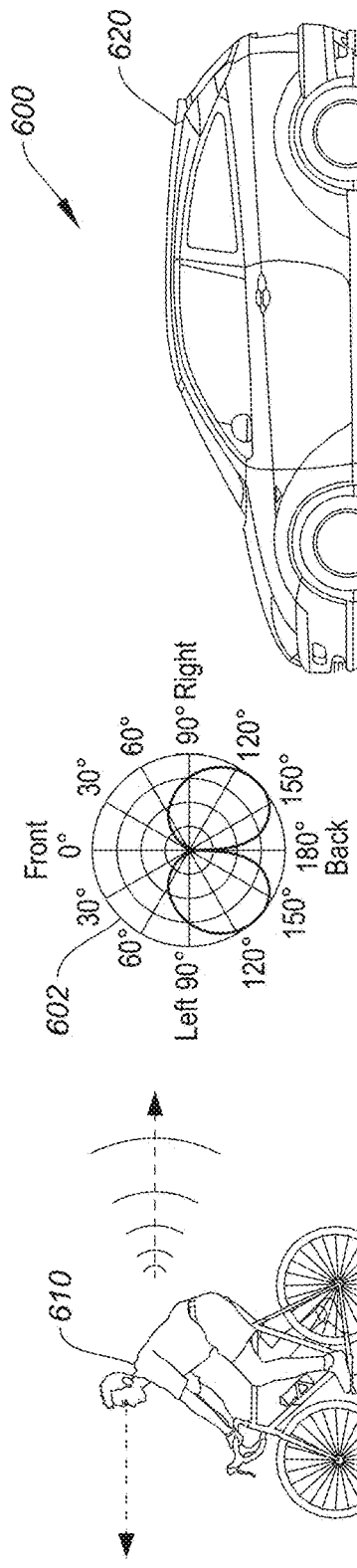
FIG. 6A shows a biker with an audio device configured with a rear facing cardioid pattern, according to certain embodiments.
Figure 6B:
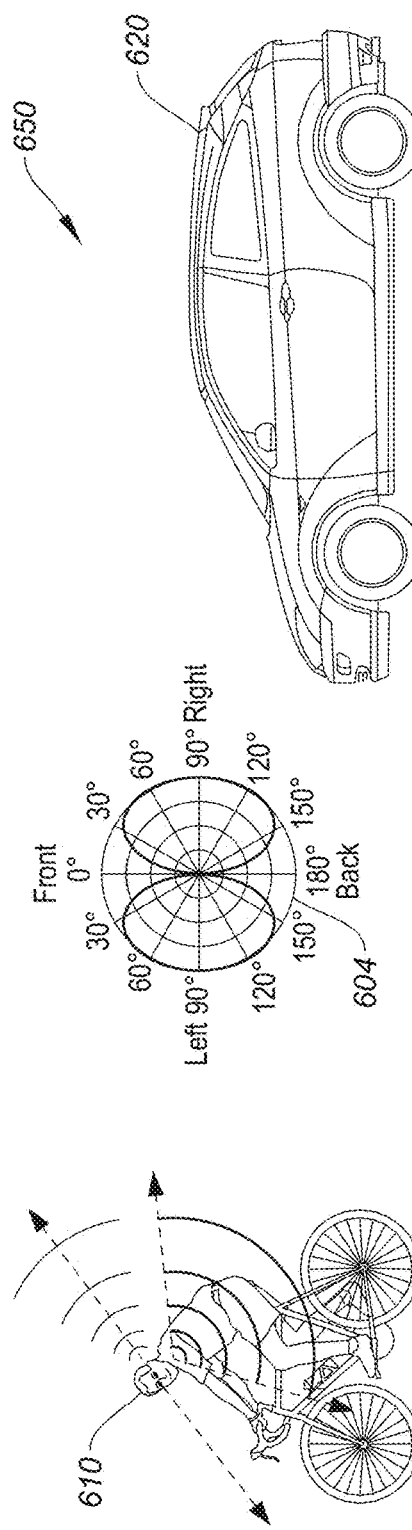
FIG. 6B shows a biker with an audio device configured with an omnidirectional cardioid pattern, according to certain embodiments.

In another example, FIG. 6A presents a scenario where once again a biker 610 may be listening to music with an audio cardioid pattern 602 directed behind him so that sounds from vehicles 620 approaching from behind are amplified and included into biker 610's audio mix. This arrangement can work well when the biker's head is directed forward, as shown, because the rear-facing audio cardioid pattern 602 will be properly oriented to detect sound from rear approaching vehicles. However, if biker 610 turns his head in the manner shown in FIG. 6B, then the orientation of his head no longer puts rear-approaching traffic behind him based on audio cardioid pattern 602, which may prevent biker 610 from hearing approaching traffic from the rear at a sufficient volume. Aspects of the invention allow the audio device to momentarily change the audio cardioid pattern (e.g., to an omnidirectional audio cardioid pattern 604) to ensure that the user (biker 610) can hear sounds (e.g., vehicle and road noise) coming from behind him. When biker 610 turns his head back to a forward facing direction, the audio cardioid pattern of the audio device may revert back to audio cardioid pattern 602. In some embodiments, the characterization profile generated by the host computing device may incorporate data corresponding to the setting and environment conditions of biker 510, including his location (e.g., a remote two-lane road), his mode of movement (e.g., via bicycle), his audio environment (e.g., road noise, white noise, human speech, etc.), and the like, and audio device 512 may be configured to change between multiple audio cardioid patterns based on the characterization profile and the current audio received by the audio device's multiple microphones including an approaching vehicle 530 from the rear, human speech from another person (biker 520), or other sound source designated to influence a current audio cardioid pattern accordingly. In some implementations, an IMU on the host computing device can be used to determine an orientation of biker 610's head, as described above, which can be used as part of the criteria for determining whether the audio device should switch between audio cardioid patterns in the manner described above. One of ordinary skill in the art with the benefit of this disclosure would appreciate the many modifications, variations, and alternative embodiments thereof.

Figure 7:
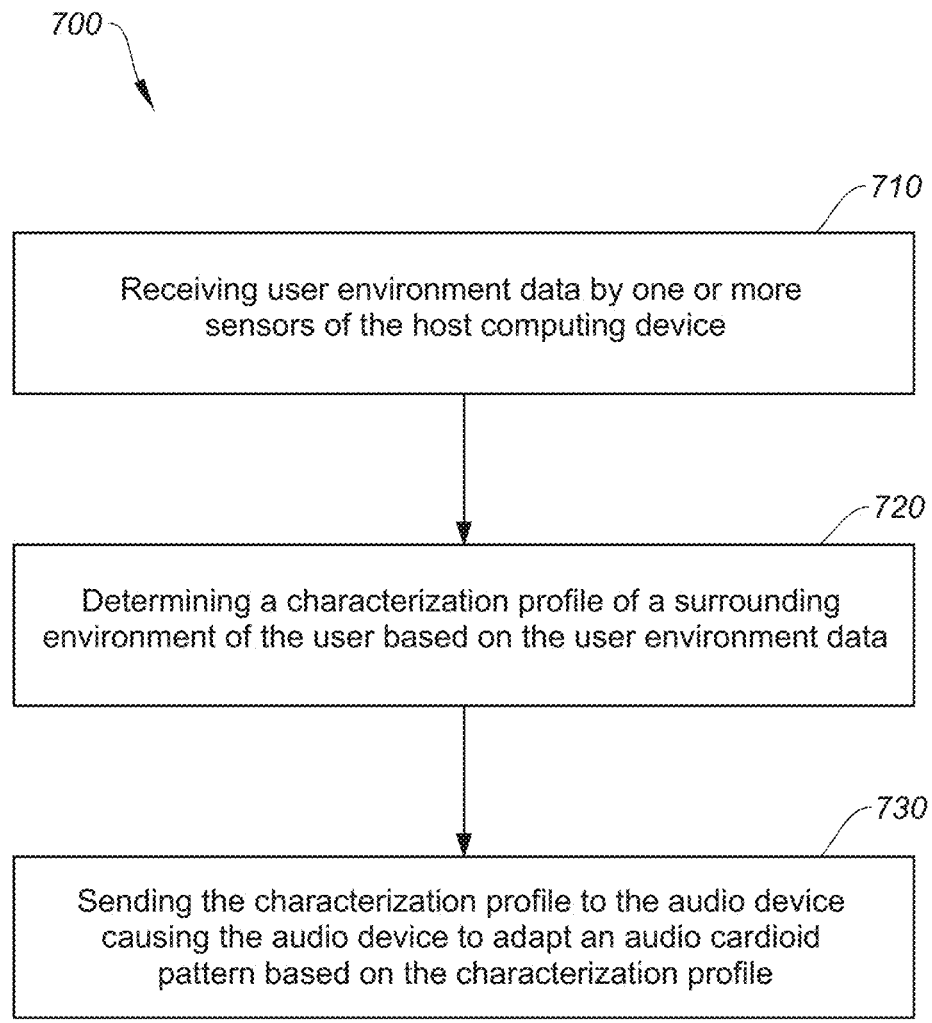
FIG. 7 is a simplified flow chart showing a method for operating a host computing device to cause an audio device to dynamically adjust performance characteristics, according to certain embodiments.

FIG. 7 is a simplified flow chart showing aspects of a method 700 for operating a host computing device to adjust performance characteristics on an audio device, according to certain embodiments. Method 700 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 700 can be performed by aspects of processor 302 and system 300, processor 210 and system 200 (e.g., when the host computing device and audio device are combined into one system, such as with smart glasses), or a combination thereof.

At operation 710, method 700 can include generating, by one or more processors on the host computing device, user environment data, according to certain embodiments. The user environment data may include data collected by one or more sensors on the host computing device, including GPS data corresponding to a location of the user, audio data corresponding ambient sounds around the user, acceleration data corresponding to a motion of the user, orientation data corresponding to an orientation of the user, or internet access point data, which may correspond to a location of the user.

At operation 720, method 700 can include determining a characterization profile of a surrounding environment of the user based on the user environment data, according to certain embodiments.

At operation 730, method 700 can include sending the characterization profile (and in some cases the user environment data) to an audio device, causing the audio device to adapt an audio cardioid pattern on a plurality of microphones on the audio device based on the characterization profile and/or the user environment data, according to certain embodiments. In some aspects, the audio device can be configured to be worn by the user such that a speaker of the audio device projects audio into the user's ear. The audio cardioid can include at least one of a forward facing cardioid pattern, a rear facing cardioid pattern, and an omnidirectional cardioid pattern. By way of example, in some aspects user environment data may include data corresponding to human speech directed to the user, and adapting the audio cardioid pattern of the plurality of microphones on the audio device can include dynamically selecting the audio cardioid pattern having a best fidelity or amplitude of the human speech directed to the user. In some cases, adapting the audio cardioid pattern of the plurality of microphones on the audio device based on the characterization profile further includes adjusting equalization (EQ) parameters or audio level balancing to improve a fidelity or amplitude of particular sounds directed to the user (e.g., human speech). It should be noted that many of the embodiments herein discuss using environmental data (e.g., audio) detected by the host computing device, although some embodiments may also capture environment data from the audio device (e.g., audio capture by the plurality of microphones). In some cases, the host computer device may "command" the audio device to configure their plurality of microphones in a particular cardioid pattern, or the audio device may determine a cardioid pattern based on the characterization profile, or the like. One of ordinary skill in the art with the benefit of this disclosure would appreciate the many modifications, variations, and alternative embodiments thereof.

It should be appreciated that the specific steps illustrated in FIG. 7 provide a particular method 700 for dynamically adjusting audio device performance characteristics, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Figure 8:
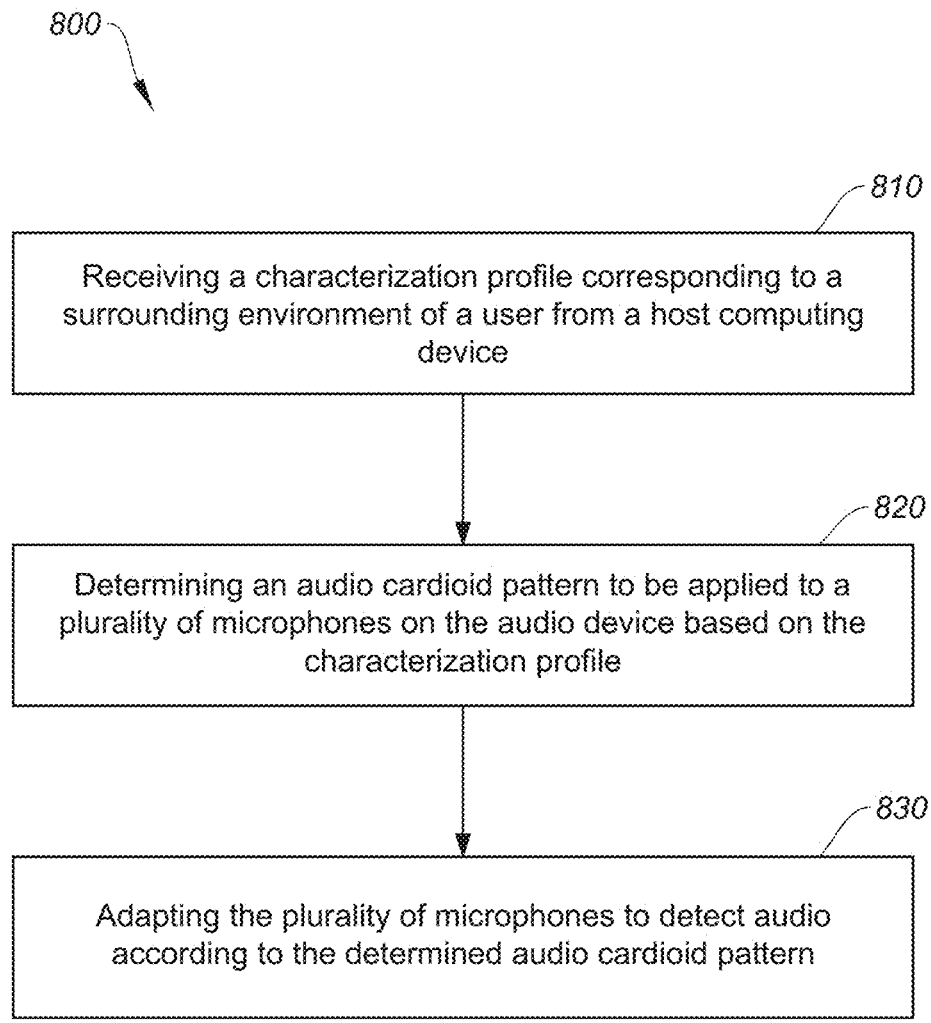
FIG. 8 is a simplified flow chart showing a method for operating an audio device to dynamically adjust performance characteristics, according to certain embodiments.

FIG. 8 is a simplified flow chart showing a method 800 for operating an audio device to dynamically adjust performance characteristics, according to certain embodiments. Method 800 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 800 can be performed by aspects of processor 210 and system 200, processor 302 of system 300 (e.g., when the host computing device and audio device are combined into one system, such as with smart glasses), or a combination thereof.

At operation 810, method 800 can include receiving, by one or more processors on the audio device, a characterization profile corresponding to a surrounding environment of a user from a host computing device wirelessly and communicatively coupled to the audio device, according to certain embodiments. The characterization profile can be based on user environment data collected by the host computing device. In some aspects, the audio device can be configured to be worn by a user such that a speaker of the audio device projects audio into the user's ear.

At operation 820, method 800 can include determining, by the one or more processors (210), an audio cardioid pattern to be applied to a plurality of microphones on the audio device based on the characterization profile, according to certain embodiments.

At operation 830, method 800 can include adapting the plurality of microphones to detect audio according to the determined audio cardioid pattern, according to certain embodiments. In some aspects, the audio device can be one of a wireless audio headset or a set of wireless audio earbuds. The user environment data can include at least one of GPS data corresponding to a location of the user, audio data corresponding to ambient sounds around the user, acceleration data corresponding to a motion of the user, orientation data corresponding to an orientation of the user, or internet access point data corresponding to a location of the user. The audio cardioid pattern may include at least one of a forward facing cardioid pattern, a rear facing cardioid pattern, and an omnidirectional cardioid pattern. In some implementations, the user environment data may include data corresponding to human speech directed to the user, and adapting the audio cardioid pattern of the plurality of microphones on the audio device can include dynamically selecting the audio cardioid pattern having a best fidelity or amplitude of the human speech directed to the user. In further embodiments, adapting the audio cardioid pattern of the plurality of microphones on the audio device based on the characterization profile can further includes adjusting equalization parameters or audio level balancing to improve a fidelity or amplitude of the human speech directed to the user.

It should be appreciated that the specific steps illustrated in FIG. 8 provide a particular method 800 for operating an audio device to dynamically adjust performance characteristics, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

In some embodiments, machine learning (ML) can be used to train the detection of specific sounds or sound types. For example, some types of sounds that can be detected and identified via training may include car engine noise, road noise, car horns, and the like. Training can be achieved by feeding samples (e.g., often hundreds or thousands of samples) of car engine noise, road noise, and car horn sounds into the ML model and classifying these sounds (e.g., as "traffic"). The trained model can then be used to determine whether there is traffic or not, which can inform how to classify the user's environment. Other sounds may include sirens or glass breaking, which can be trained and recognized, which may inform the characterization profile to indicate an omnidirectional setting ("omni aware") may be appropriate so the user can hear noises from all angles to ascertain the situation. One of ordinary skill in the art with the benefit of this disclosure would appreciate the many modifications, variations, and alternative embodiments thereof.

In some embodiments, VAD can be achieved by measuring the input audio level and doing frequency analysis of the incoming audio. For example, if the audio is at or above a particular audio threshold level (e.g., a "loudness" that is higher than background noise) and the frequency content measures high in the speech band, then the system may deduce that someone is speaking to the user and can trigger a VAD flag in the system. In another example, the spectral energy of detected audio can be examined. Using frequency analysis, it may be determined that a front microphone on the audio device is picking up low frequency noise (e.g., car noise) and the rear microphone is picking up more speech frequencies but not VAD activity (e.g., no one is speaking to the user). In such cases, a cardioid pattern may be selected that results in less ambient noise for the user. In another example, as described in the scenario above, if wind is picked up on one earbud and not the other, the microphone with the lower noise level may be used to detect speech for better clarity, while the microphone with the higher amounts of wind noise may be turned down. In some cases, the frequency content of noise can be analyzed to determine which earbud has less ambient speech and/or crosstalk noise to help with phone call quality. One of ordinary skill in the art with the benefit of this disclosure would appreciate the many modifications, variations, and alternative embodiments thereof.

As noted above, many examples described in the present disclosure are directed to the host computing device collecting and processing environment data and generating a characterization profile based on the environment data. The characterization profile is typically sent to the audio device, which it uses to determine an optimal cardioid pattern arrangement, in some cases, the environmental data may be sent to the audio device and proceed there (e.g., smart glasses). Typically, the earbuds use the characterization profile to determine the best cardioid pattern, although in some embodiments, the host computing device may determine the cardioid pattern. One of ordinary skill in the art with the benefit of this disclosure would appreciate the many modifications, variations, and alternative embodiments thereof.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. An audio device comprising:
    one or more processors;
    a speaker controlled by the one or more processors;
    a plurality of microphones controlled by the one or more processors; and
    a communication module configured to wirelessly and communicatively couple the audio device to a remote host computing device,
    wherein the one or more processors are configured to:
        receive a characterization profile corresponding to a surrounding environment of a user from the host computing device via the communication module, the characterization profile based on user environment data collected by the host computing device;
        adapt an audio receiving pattern of the plurality of microphones to a first audio receiving pattern based on the characterization profile;
        receive a modified characterization profile from the host computing device corresponding to a detected event;
        temporarily change the audio receiving pattern to a second audio receiving pattern while the detected event is detected; and
        switch back to the first audio receiving pattern when the detected event is no longer detected.

2. The audio device of claim 1 wherein the characterization profile is further based on user environment data including GPS data corresponding to a location of the user.

3. The audio device of claim 1 wherein the characterization profile is further based on user environment data including acceleration data corresponding to a motion of the user or orientation data corresponding to an orientation of the user.

4. The audio device of claim 1 wherein the characterization profile is further based on user environment data including internet access point data.

5. The audio device of claim 1 wherein the audio receiving pattern includes at least one of a forward-facing receiving pattern, a rear facing receiving pattern, and an omnidirectional receiving pattern.

6. The audio device of claim 1 wherein audio device is one of a wireless audio headset or a set of wireless audio earbuds.

7. The audio device of claim 1 wherein the characterization profile includes data corresponding to human speech directed to the user, and wherein adapting the audio receiving pattern of the plurality of microphones on the audio device based on the characterization profile includes dynamically selecting the audio receiving pattern having a best fidelity or amplitude of the human speech directed to the user.

8. The audio device of claim 7 wherein adapting the audio receiving pattern of the plurality of microphones on the audio device based on the characterization profile further includes adjusting equalization parameters or audio level balancing to improve a fidelity or amplitude of the human speech directed to the user.

9. A method of operating an audio device, the method comprising:
    receiving a characterization profile corresponding to a surrounding environment of a user from a host computing device via a communication module, the characterization profile based on user environment data collected by the host computing device;
    adapting an audio receiving pattern of a plurality of microphones to a first audio receiving pattern based on the characterization profile;
    receiving a modified characterization profile from the host computing device corresponding to a detected event;
    temporarily changing the audio receiving pattern to a second audio receiving pattern while the detected event is detected; and
    switching back to the first audio receiving pattern when the detected event is no longer detected.

10. The method of claim 9 wherein the characterization profile is further based on user environment data including GPS data corresponding to a location of the user.

11. The method of claim 9 wherein the characterization profile is further based on user environment data including acceleration data corresponding to a motion of the user or orientation data corresponding to an orientation of the user.

12. The method of claim 9 wherein the characterization profile is further based on user environment data including internet access point data.

13. The method of claim 9 wherein the audio receiving pattern includes at least one of a forward-facing receiving pattern, a rear facing receiving pattern, and an omnidirectional receiving pattern.

14. The method of claim 9 wherein audio device is one of a wireless audio headset or a set of wireless audio earbuds.

15. The method of claim 9 wherein the characterization profile includes data corresponding to human speech directed to the user, and wherein adapting the audio receiving pattern of the plurality of microphones on the audio device based on the characterization profile includes dynamically selecting the audio receiving pattern having a best fidelity or amplitude of the human speech directed to the user.

16. The method of claim 15 wherein adapting the audio receiving pattern of the plurality of microphones on the audio device based on the characterization profile further includes adjusting equalization parameters or audio level balancing to improve a fidelity or amplitude of the human speech directed to the user.

\* \* \* \* \*